Patented Mar. 22, 1949

2,465,126

UNITED STATES PATENT OFFICE 2,465,126

RUBBER RECOVERY METHOD

Robert H. Stanton, San Marino, Calif.

No Drawing. Application June 5, 1944,
Serial No. 538,874

3 Claims. (Cl. 47—10)

This application relates to a process for the economical recovery of rubber from succulent plant material and pertains particularly to the recovery of rubber under such conditions as to cause the minimum loss of the rubber latex and a minimum consumption of hand labor.

One of the important objects of this invention is to provide a method of harvesting shoots of a latex-bearing plant having a normal tendency to "bleed" when severed, whereby such "bleeding" is kept to a negligible minimum and the latex content of the cuttings and parent plant thus preserved.

A further important object of the invention is to provide a method of harvesting latex-bearing shoots and the like from vine-like latex producing plants at a reduced cost as compared with prior suggested procedures.

The description of the present invention pertains more particularly to the production of rubber from a vine-like plant of the type known under the name of Cryptostegia, such as *Cryptostegia grandiflora*. This plant is under cultivation in Haiti at the present time, and is known to be quite productive of rubber of a very good grade. At the present time, however, the labor cost for producing the rubber by harvesting the latex which is collected from the plants by the so-called "bleeding" procedure is quite high, and while the resultant cost of the rubber is not considered too much to pay for a strategic material during the present emergency, such cost is much too high for rubber in normal years. The present practice is to tap the bushes some eight months to a year after planting by cutting the tip of the vine-like shoot and collecting the drippings. The vines are then trimmed off at the cut ends every other day and the cut ends are saved along with the drippings from the shoots in order to recover the small amount of rubber which coagulates at the end of the cut. This plant has a considerable advantage over a plant such as guayule, in that the plant itself is not destroyed when the rubber is collected. As a matter of fact, the producing age or life expectancy of the Cryptostegia vine is not known, but appears to be substantially indefinite. This long production life, together with the plant's fast growth, makes it an ideal plant for the production of rubber, but the outstanding high labor costs preclude the economic collection and recovery of rubber from this plant in continental United States by heretofore known methods. All present known activities of any scale are being conducted where labor costs are relatively low.

According to the present invention, I provide a method of harvesting rubber from plants of the type exemplified by Cryptostegia by cutting latex-bearing plant portions, such as branches, stems, shoots or the like in such manner that the "bleeding" of the cut portion and the parent plant is substantially eliminated, whereby the latex content of the plant is preserved within the removed plant material, which later is subjected to a recovery process for the production of the desired rubber material. It may thus be seen that the present invention is directed to a process for the recovery of rubber from this very advantageous type of producing plant, under such conditions that the plant itself is not harmed, and the feature of retaining the latex within the severed material makes the process adaptable to mechanical type of collection and harvesting procedures, and eliminates any adverse effect of the unavoidable lapse of time between the harvesting of the latex-bearing shoots and the subsequent recovery of the rubber therefrom, thus materially decreasing the per pound cost of production.

The process of the present invention comprises, essentially, the steps of cutting latex-bearing portions or the like from a succulent plant through the agency of heated knives or shears which sear the cut ends of both the parent stock and the cutting and substantially wholly prevent the loss of rubber latex from the severed ends. The severed "cuttings" are then subjected to a rubber recovery process, which may comprise comminution followed by immersion in an anticoagulant which will have the effect of allowing the latex to bleed from the comminuted cuttings in the production of a dilute latex which later may be concentrated, coagulated or the like in the production of a coagulum.

The cutting of the latex-bearing shoots may be practiced through the use of cutting shears or knives which are electrically heated, such as are shown in U. S. Patent No. 2,032,688 issued March 3, 1936 to R. H. Dart. It has been found that a temperature in the neighborhood of 800 to 1000° F. should be maintained at the cutting edge in order that adequate coagulation or searing of the wound at the cut ends of both the vine and the cutting is obtained. As shown in Fig. 2 of the above mentioned patent, the electrically heated cutting member may be associated with a suitable source of electric energy such as a gasoline engine driven generator or the like mounted upon a convenient truck which may be driven through the field in which the rubber producing plants are growing. As an added convenience in harvesting, a collecting trailer could be attached to the truck which carries the source of power for the cutting members, within which the cuttings could be collected for further processing in the recovery of the rubber content. The cut shoots are gathered and preferably transported to a centrally located point for further treatment to recover the rubber therefrom. Even though considerable time may thus elapse between the time of cutting and the time of rubber recovery treatment, loss of rubber during this interval is prevented by the searing treatment imparted in the cutting operation.

According to a preferred procedure of recovering the rubber content from severed cuttings, in particular, cuttings obtained from vines of the character of the Cryptostegia family, I stack the harvested cuttings in an alined relation, with the tip ends all extending in the same direction, and remove a large proportion of the rubber content by expressing the latex through the agency of expressing rolls, preferably passing the cuttings into the rolls tip ends first. The expressed latex may be collected in an ammoniacal solution of a strength sufficient to prevent coagulation, and the feed side of the expressing rolls is preferably subjected to a fine spray of the ammoniacal solution in order to assist the travel of latex to the collecting vat. The rubber content of the resulting latex solution may be recovered by known methods, such as coagulation or solvent extraction as by means of ether.

The rolled stems or cuttings may be subjected to an extraction operation to recover additional quantities of rubber, as by the use of tetrachloroethane or dichloroethane. The bagasse after such extraction will consist principally of the longitudinal fibers of the plant, which may be washed or scrubbed to remove adhering cellular structure or other foreign matter and recovered as a valuable by-product. The dried fibers from *Cryptostegia grandiflora* have been found to have strength and other characteristics intermediate between hemp and jute fibers.

It has been found that a rubber-bearing plant of the type exemplified by the Cryptostegia family will tolerate many harvestings of the tips according to this invention without damage to the parent plant and will produce new growth rapidly following each cutting. As a matter of fact, it appears that the plant will stand as many as thirty harvestings during the growing season. The use of the searing type of cutting effectively prevents loss of the latex and apparently causes little harm to the parent plant. As a matter of fact, it appears to stimulate the growth of new shoots which are in a very short time ready for fresh harvesting.

It has been found preferable to harvest the cutting when the vine ends, branches or shoots are from about 6 to 30 inches in length beyond the point of cutting, for the optimum recovery of the rubber content. Where a long-fiber by-product is of material benefit, the vine-ends may be allowed to attain a greater length, as will be apparent.

While I have described illustrative embodiments of this invention in broad terms, it will be appreciated that I do not consider my invention limited to the precise details set forth herein, but rather to the scope of the subjoined claims.

I claim:

1. The process of recovering rubber from latex-bearing succulent plants which comprises: severing latex-bearing portions from a parent latex-bearing plant by a combined cutting and heating operation to sear the severed ends of the cut portions and the parent plant to an extent sufficient to prevent "bleeding"; and subjecting the cut portions to a recovery process whereby the rubber content is removed therefrom.

2. The process of recovering rubber from latex-bearing succulent plants which comprises: severing latex-bearing portions from a parent latex-bearing plant by a combined cutting and heating operation to sear the severed ends of the cut portions and the parent plant to an extent sufficient to prevent "bleeding"; gathering the cut portions while retaining the latex therein; and thereafter removing the rubber content from the cut portions so gathered.

3. The process of recovering rubber from latex-bearing plants of the type characterized by the family Cryptostegiae, which comprises; harvesting latex-bearing vine end-portions of from about six to thirty inches in length from a parent plant of the character described by a combined cutting and heating operation to sear the severed ends of both cutting and parent plant portions to an extent sufficient to prevent "bleeding" of latex therefrom; subjecting such cuttings to an expression treatment to express the latex therefrom, and recovering rubber from such latex.

ROBERT H. STANTON.

REFERENCES CITED

The following references are of record in the file of this patent:

UNITED STATES PATENTS

| Number | Name | Date |
| --- | --- | --- |
| 2,281,336 | Stacom | Apr. 28, 1942 |

FOREIGN PATENTS

| Number | Country | Date |
| --- | --- | --- |
| 13,186 | India | 1927 |

OTHER REFERENCES

"Cryptostegia as a Possible Source of Rubber." Circular published Aug. 1, 1942 by U. S. Dept. of Agr., Bureau of Plant Industry, Rubber Plant Investigations.

Dolley: "On the Occurrence of Palay Rubber." India-Rubber Journal, vol. 41, pp. 30–32. May 20, 1911.

Trumbull: "Growing Rubber in North America." Ind. Eng. Chem., vol. 34, pp. 1328–1335. Nov. 1942.